United States Patent [19]

Shiga

[11] Patent Number: 4,591,036
[45] Date of Patent: May 27, 1986

[54] SINGLE REVOLUTION CLUTCH

[75] Inventor: Takashi Shiga, Fuchu, Japan

[73] Assignee: Osawa Press Mfg. Co., Ltd., Japan

[21] Appl. No.: 687,480

[22] Filed: Dec. 28, 1984

[51] Int. Cl.⁴ .................. F16D 15/00; F16D 41/02
[52] U.S. Cl. ............................... 192/27; 192/33 R;
192/45; 192/93 R
[58] Field of Search ............... 192/27, 31, 33 R, 45,
192/52, 72, 93 R; 74/569

[56] References Cited

U.S. PATENT DOCUMENTS

| | | | |
|---|---|---|---|
| 2,716,476 | 8/1955 | Hunter | 192/27 |
| 2,990,043 | 6/1961 | Fink | 192/27 |
| 3,291,269 | 12/1966 | Merta | 192/27 |
| 3,487,900 | 1/1970 | Dahl | 192/27 |

OTHER PUBLICATIONS

"Sr Clutch" (author unknown), 1974, pp. 3-9.

Primary Examiner—William F. Pate, III
Assistant Examiner—James J. Merek
Attorney, Agent, or Firm—Darby & Darby

[57] ABSTRACT

A clutch includes an inner clutch member of a cylindrical shape fixedly mounted on a shaft for rotation therewith, a bushing mounted on the inner clutch member, and an outer clutch member mounted on the bushing and driven for rotation at a predetermined speed, coupling elements carried by the bushing for coupling the inner and outer clutch members together, a first cam fixedly mounted on the shaft for rotation therewith, and a second cam pivotally mounted on the first cam and coupled to the bushing. An actuator initiates a revolution of the first cam, and it engages an acceleration section of a cam surface of the first cam at an initial portion of the revolution of the first cam to rotate it at a speed generally corresponding to a speed of rotation of the outer clutch member. The actuator engages a deceleration section of the cam surface at a final portion of the revolution to decelerate the speed of rotation of the first cam. The second cam is angularly moved in one direction immediately after the initial portion of the revolution of the first cam to bring the coupling elements into locking engagement with the inner and outer clutch members to engage the clutch. The second cam is also angularly moved in the other direction immediately before the final portion of the revolution of the first cam to bring the coupling elements out of locking engagement with the inner and outer clutch members. At the final portion of the revolution of the first cam, the actuator is automatically set in its operative position for driving the first cam.

5 Claims, 9 Drawing Figures

SINGLE REVOLUTION CLUTCH

BACKGROUND OF THE INVENTION

1. Field of the Invention

This invention relates to a clutch.

2. Prior Art

The type of clutches with which the present invention is concerned are used, for example, in an apparatus for automatically fastening an electrical terminal to an end of a length of wire. One such conventional clutch shown in FIGS. 1 and 2 comprises an outer clutch member 10 of a cylindrical shape connected to a drive means (not shown), an inner clutch member 11 of a cylindrical shape fixedly secured by a key 12 to a shaft 13 connected to a load (not shown), and a bushing 14 mounted on the inner clutch member 11 and supporting a plurality of rollers 15 interposed between the inner and outer clutch members 11 and 10. A spring 16 extends between a pin 17 secured to the inner clutch member 11 and a screw 18 threaded into the bushing 14 to urge the bushing 14 to angularly move in a clockwise direction (FIG. 2) about the axis of the shaft 13. The bushing 14 is held in its inoperative position (FIG. 2) by a keeper means (not shown) against angular movement.

The operation of this conventional clutch will be described with reference to FIGS. 3 and 4.

When the bushing 14 is held in its inoperative position, each roller 15 is not clamped or locked by the inner and outer clutch members 11 and 10, as shown in FIG. 3, since each roller 15 is disposed at a respective one of flat portions on the outer circumferential surface of the inner clutch member 11. In this condition, when the drive means drives the outer clutch member 10 to rotate in a clockwise direction, the rotation of the outer clutch member 10 is not transmitted to the inner clutch member 11. And, when the keeper means is disengaged from the bushing 14, the bushing 14 is angularly moved instantaneously at an angle A from its inoperative (FIG. 3) to operative (FIG. 4) position under the influence of the spring 16, so that each roller 15 is forced in between and brought into locking engagement with the inner and outer clutch members 11 and 10. As a result, the rotation of the outer clutch member 10 is transmitted to the inner clutch member 11. Before the outer clutch member 10 is coupled to the inner clutch member 11, the former is rotated usually at a speed of 250 rpm while the latter remains stationary. Therefore, a substantial impact is generated when the rollers 15 are brought into locking engagement with the inner and outer clutch members 11 and 10, thereby causing substantial impact and vibration. Also, when this conventional clutch is to be disengaged, the bushing 14 is brought into striking engagement with the above-mentioned keeper means with a substantial impact since the bushing is rotated at a considerable speed together with the inner and outer clutch members 11 and 10. This also produces substantial noise and vibration.

SUMMARY OF THE INVENTION

It is therefore an object of this invention to provide a clutch of the type which can be engaged and disengaged without producing any undesirable noise and vibration.

According to the present invention, there is provided a clutch which comprises:

(a) an inner clutch member of a cylindrical shape for being fixedly mounted on a shaft having an axis of rotation;

(b) a bushing mounted on said inner clutch member for angular movement about the axis of the shaft;

(c) an outer clutch member mounted on said bushing and being connectable to drive means for being driven for rotation at a predetermined speed;

(d) coupling means carried by said bushing and interposed between said inner and outer clutch members for locking engagement with said inner and outer clutch members;

(e) a first cam of a generally circular shape fixedly mounted on the shaft for rotation therewith, said cam having around its periphery a cam surface having an actuating section and a pair of acceleration and deceleration sections on opposite sides of said actuating section, said cam having a projection;

(f) a second cam mounted on said first cam for angular movement relative thereto and coupled to said bushing, said second cam having a cam surface;

(g) keeper means engageable with said projection for holding said first cam against rotation, said keeper means being operable to become disengaged from said projection;

(h) actuator means movable into and out of an operative position in which said actuator means is engageable with said actuating section of said first cam for initiating the rotation of said first cam when said keeper means becomes disengaged from said projection, said actuator means being engageable with said acceleration section at an initial portion of one revolution of said first cam to rotate said first cam at a speed generally corresponding to said predetermined speed of rotation of said outer clutch member, said actuator means being engageable with said deceleration section at a final portion of the revolution of said first cam to decelerate the speed of rotation of said first cam, and at the final portion of the revolution of said first cam, said actuating section being engageable with said actuator means for setting it in its operative position;

(i) engaging means engageable with said cam surface of said second cam during the initial and final portions of the revolution of said first cam; and (j) urging means for urging said second cam to angularly move in one direction when said engaging means becomes disengaged from said cam surface of said second cam immediately after the initial portion of the revolution of said first cam, thereby angularly moving said bushing relative to said inner clutch member to bring said coupling means into locking engagement with said inner and outer clutch members to connect them together;

(k) said engaging means being engageable with said second cam immediately before the final portion of the revolution of said first cam, thereby angularly moving said second cam in the other direction to angularly move said bushing relative to said inner clutch member to bring said coupling means out of locking engagement with said inner and outer clutch members to disconnect them.

DESCRIPTION OF THE PREFERRED EMBODIMENT OF THE INVENTION

Figure 1:
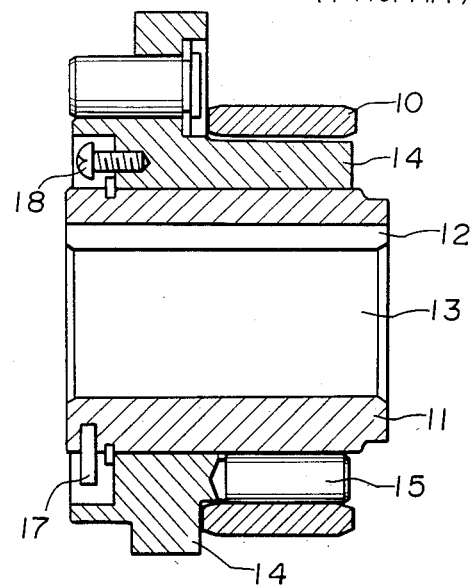
FIG. 1 is a cross-sectional view of a clutch provided in accordance with the prior art.
Figure 2:
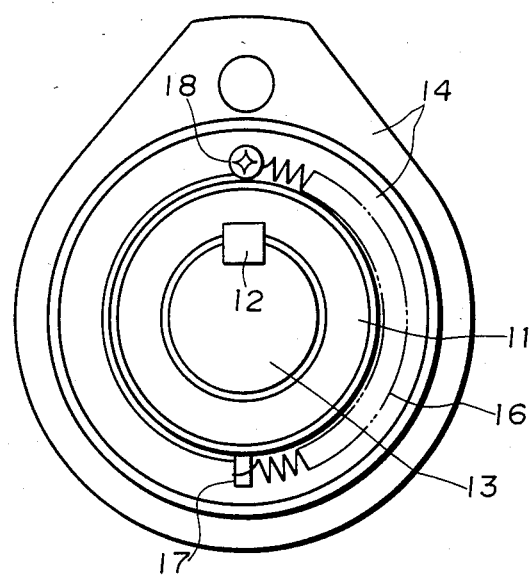
FIG. 2 is an elevational view of the clutch.
Figure 3:
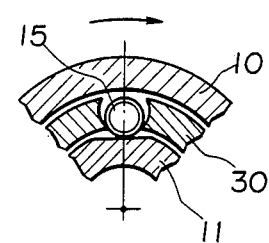
FIGS. 3 and 4 are fragmentary cross-sectional views of the clutch, showing the disengaged and engaged conditions thereof, respectively.
Figure 4:
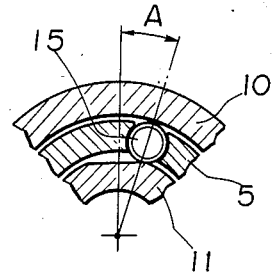
Figure 5:
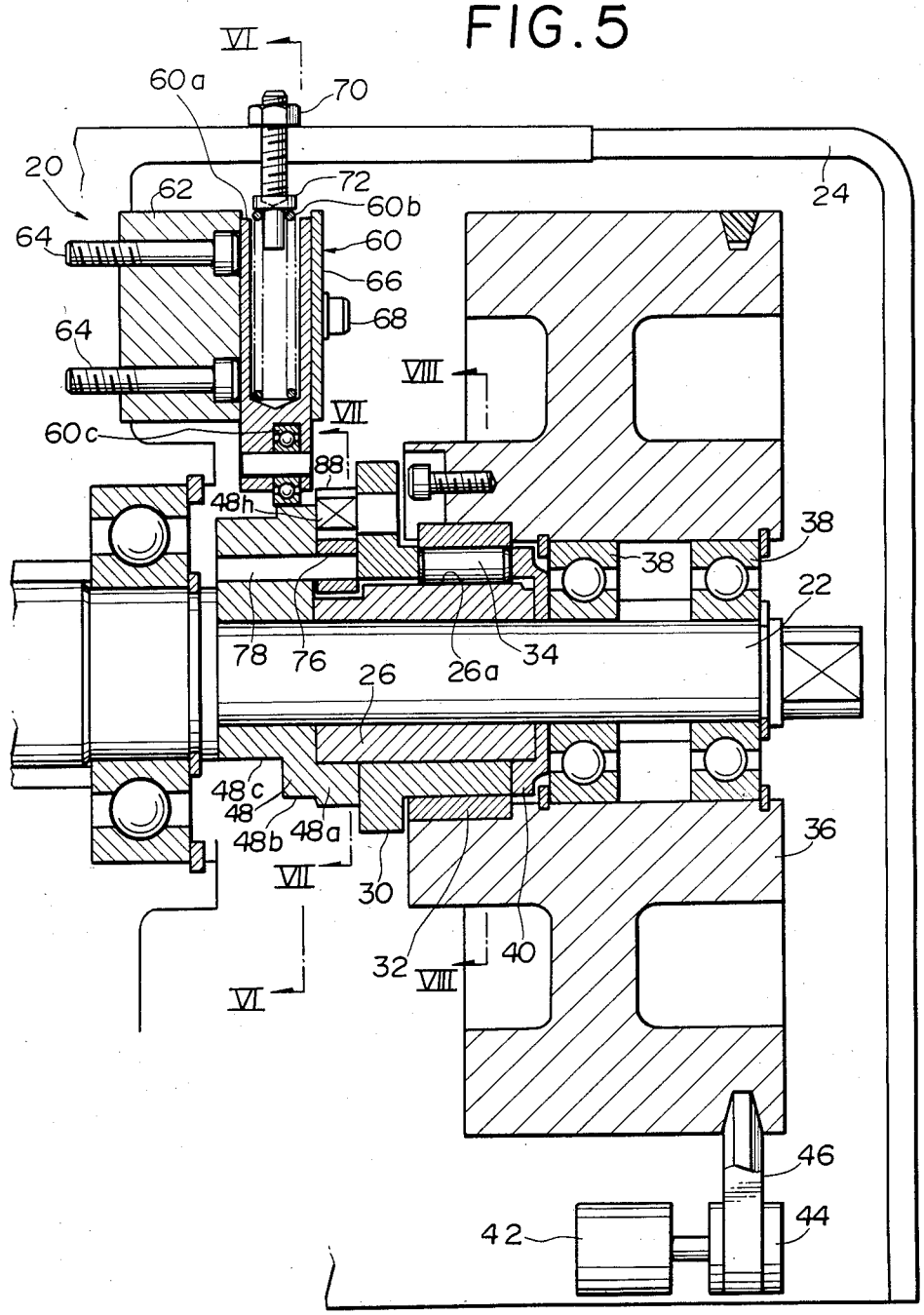
FIG. 5 is a cross-sectional view of a clutch provided in accordance with the present invention.
Figure 6:
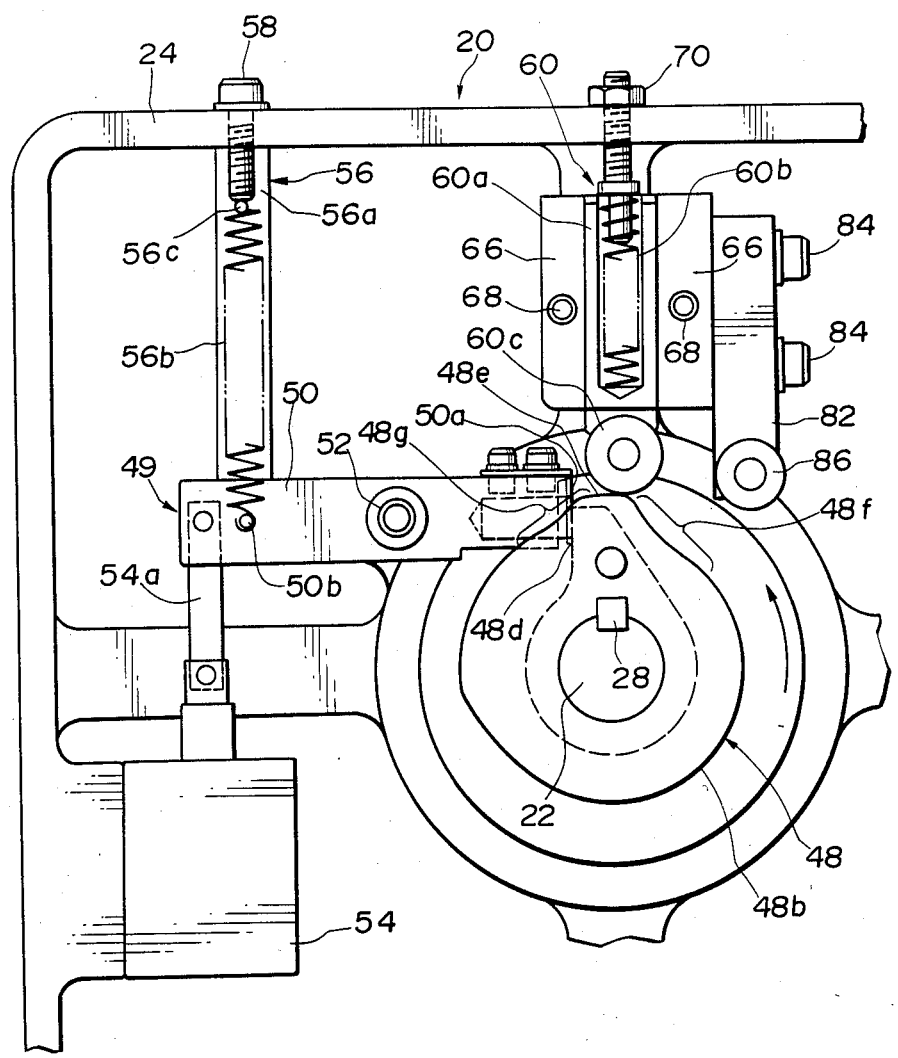
FIG. 6 is a cross-sectional view taken along the line VI—VI of FIG. 5.
Figure 8:
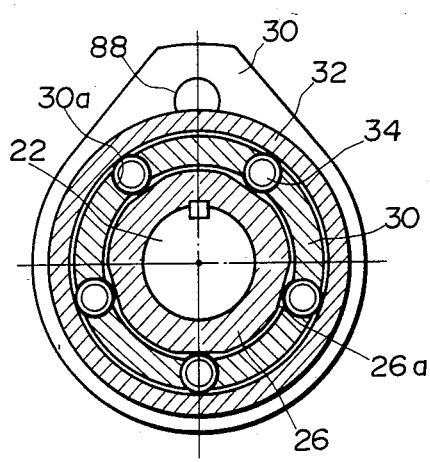
FIG. 8 is a cross-sectional view taken along the line VIII—VIII of FIG. 5, showing the clutch in its disengaged condition.
Figure 9:
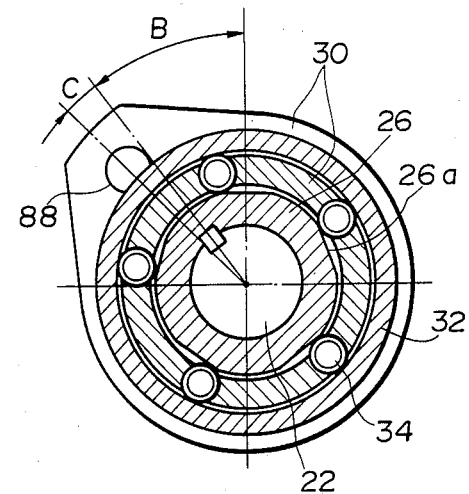
FIG. 9 is a view similar to FIG. 8 but showing the clutch in its engaged condition.

A clutch 20 shown in FIGS. 5 and 6 is applied to an apparatus for automatically fastening an electrical terminal to an end of a length of wire. A crank shaft 22 is mounted on a body 24 of the terminal fastening apparatus for rotation about its axis and is operatively connected to a load (not shown). An inner clutch member 26 of a cylindrical shape is mounted on the crank shaft 22 and fixedly secured thereto by a key 28 for rotation therewith. A plurality of flat portions 26a are formed on the outer circumferential surface of the inner clutch member 26 and spaced from one another at equal intervals, the flat portions 26a extending along the axis of the inner clutch member 26. A tubular bushing 30 is mounted on the inner clutch member 26, and an outer clutch member 32 of a cylindrical shape is rotatably mounted on the bushing 30. The bushing 30 has a plurality of circumferentially-spaced slots 30a formed through that portion interposed between the inner and outer clutch members 26 and 32, each of the slots 30a extending axially of the bushing 30 and having a pair of opposed semi-cylindrical concave surfaces, as best shown in FIGS. 8 and 9. The plurality of slots 30a are disposed in registry with the respective flat portions 26a of the inner clutch member 26, and receive rollers or coupling means 34 therein, respectively. When the clutch 10 is in its inoperative or disengaged condition shown in FIGS. 6 and 8, each roller 34 is disposed generally centrally of the width of a respective one of the flat portions 26a and is loosely held in between the inner and outer clutch members 26 and 32. Also, when the clutch 10 is in its operative or engaged condition, each roller 34 is held in locking engagement with the inner and outer clutch members 26 and 32, as later described.

A flywheel 36 is rotatably mounted on the shaft 22 via bearing members 38 and is fixedly secured to the outer clutch member 32 for rotation therewith. A ring 40 is mounted on the shaft 22 and interposed between the inner clutch member 26 and the left-side bearing member 38 (FIG. 5). A drive means 42 in the form of an electric motor is connected to the flywheel 36 via a pulley 44 and a belt 46 to drive the flywheel 36 for rotation.

Figure 7:
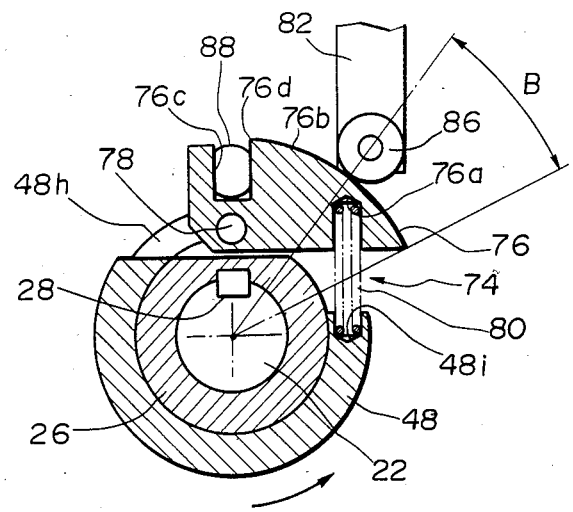
FIG. 7 is a cross-sectional view taken along the line VII—VII of FIG. 5.

As shown in FIGS. 5 to 7, a cam 48 of a generally circular shape is mounted on the shaft 22 and fixedly secured thereto by the key 28 for rotation therewith, the cam 48 being disposed adjacent to the inner clutch member 26. The cam 48 has a major portion 48a having a cam surface 48b at its periphery, and a stepped portion 48c formed on one side thereof facing away from the inner clutch member 26. The stepped portion 48c has an projection 48d extending radially outwardly therefrom. The cam surface 48b has an actuating section 48e and a pair of acceleration and deceleration sections 48f and 48g disposed adjacent to and on opposite sides of the actuating section 48e.

Keeper means 49 is provided for holding the cam 48 against rotation. More specifically, a lever 50 is rotatably mounted on the body 24 by a pin 52, and one end of the lever 50 is pivotally connected to a plunger 54a of a solenoid 54 mounted on the body 24. A positioning means 56 is provided for holding the lever 50 in its operative position in which the free end 50a of the lever 50 is held in engagement with the projection 48d of the cam 48 to hold the cam against rotation as shown in FIG. 6, as hereinafter more fully described. The positioning means 56 comprises an elongated body 56a secured to the body 24 by a screw 58 and a tension spring 56b extending between a pin 56c secured to the body 56a and a pin 50b secured to the lever 50 for normally urging the lever into contact with the end of the body 56a to retain the lever 50 in its operative position. When the solenoid 54 is energized, the plunger 54a is retracted to angularly move the lever 50 counterclockwise about the pin 52 against the bias of the spring 56b so that the free end 50a of the lever is brought out of engagement with the projection 48d of the cam 48. The solenoid 54 is de-energized soon after the engagement of the free end 50a with the projection 48d is released, so that the lever 50 is again brought into its operative position under the influence of the spring 56b. Therefore, upon one revolution of the cam 48, the projection 48d is again brought into engagement with the free end 50a to hold the cam against rotation, as shown in FIG. 6.

An actuator means 60 is provided for actuating the cam 48 to rotate. The actuator means 60 comprises a hollow elongated body 60a, a compression spring 60b received in the body 60a, and a cam follower 60c in the form of a roller rotatably mounted on one end of the body 60a. A support member 62 is secured to the body 24 by bolts 64, and the body 60a of the actuator means 60 is held between the support member 62 and a mounting member 66 and fixed to the support member 62 by screws 68 passing through the mounting member 66 into the support member 62. A screw 70 is threaded into the body 24 and compresses the compression spring 60b through a retainer 72 so that the cam follower 60c is urged into contact with the cam surface 48b. When the clutch 10 is in its inoperative or disengaged position shown in FIGS. 6 and 8, the cam follower 60c is urged into contact with the actuating section 48e.

In the disengaged position (FIG. 6) of the clutch 10, when the solenoid 54 is energized to angularly move the lever 50 out of engagement with the projection 48d of the cam 48, the cam follower 60c disposed in contact with the actuating section 48e urges the cam 48 to angularly move in a counterclockwise direction (FIG. 6) under the influence of the compression spring 60b.

An actuator means 74 is provided for actuating the bushing 30 to move angularly relative to the inner clutch member 26. The actuator means 74 comprises a cam 76 of a generally sector-shape pivoted by a pin 78 to a surface 48h of the cam 48 facing away from the stepped portion 48c, and a compression spring or urging means 80 received in a pair of holes 76a and 48i formed respectively in the cam 76 and 48 for urging the cam 76 to angularly move about the pin 78 counterclockwise (FIG. 7). A support member 82 is fixedly secured to the mounting member 66 by screws 84, and a roller or engaging means 86 is rotatably mounted on one end of the support member 82. The cam 76 has an arcuate cam surface 76b, and the cam surface 76b is urged into contact with the roller 86 under the influence of the compression spring 80 (FIG. 7) when the clutch 10 is in its inoperative or disengaged position. The cam 76 is coupled to the bushing 30 by a pin 88 received in a notch 76c of the cam 76 and extending into the bushing 30 so that the cam 48 is angularly movably together with the bushing 30.

The compression force of the spring 60b exerted on the cam 48 and the shape of the acceleration section 48f of the cam 48 are so determined that in the inoperative condition of the clutch 10 shown in FIG. 6, before the cam 48 is angularly moved through an angle B counterclockwise, the inner clutch member 26 is accelerated to a speed of rotation substantially equal to that of the outer clutch member 32. This speed of rotation is usually about 250 rpm. When the cam 76 is rotated counterclockwise together with the bushing 30 by the angle B (FIG. 7) as a result of the rotation of the cam 48, the roller 86 is brought out of engagement with the cam surface 76b of the cam 76 whereupon the compression spring 80 urges the cam 76 to angularly move counterclockwise (FIG. 7) about the pin 78 so that the bushing 30 is angularly moved by an angle C relative to the inner clutch member 26 (FIG. 9), thereby bringing the rollers 34 into locking engagement with the inner and outer clutch members 26 and 32 to engage the clutch 10. Then, the inner and outer clutch members 26 and 32 together with the bushing 30 and the shaft 22 are rotated from the position shown in FIG. 9, and an end 76d of the cam surface 76b is brought into engagement with the roller 86, so that the cam 76 is urged by the roller 86 to rotate clockwise against the bias of the compression spring 80, thereby angularly moving the bushing 30 about the shaft 22 by the angle C relative to the inner clutch member 26 in a direction opposite to the direction of the rotation of the cam 48. As a result, the roller 34 are brought out of locking engagement with the inner and outer clutch members 26 and 32 to disengage the clutch 10. Then, the inner clutch member 26 together with the bushing 30 and the shaft 22 is further angularly moved by an inertia force to the position shown in FIGS. 6 and 7.

The mode of operation of the clutch 10 will now be described.

When the clutch 10 is in its inoperative or disengaged position shown FIGS. 6, 7 and 8, the motor 42 is first powered to rotate the outer clutch member 32 via the pulley 44, the belt 46 and the flywheel 36 at a speed of, for example, about 250 rpm. In this condition, since the rollers 34 are held out of locking engagement with the inner and outer clutch members 26 and 32 as shown in FIG. 8, the inner clutch member 26 is not caused to rotate.

Then, the solenoid 54 is energized to retract its plunger 54a to angularly move the lever 50 counterclockwise (FIG. 6) about the pin 52 against the bias of the spring 56b. As a result, the free end 50a of the lever 50 is brought out of engagement with the projection 48d of the cam 48, so that the cam 48 is caused to rotate counterclockwise under the influence of the compression spring 60b via the cam follower 60c. This rotation of the cam 48 causes the rotation or angular movement of the shaft 22, the inner clutch member 26 and the bushing 30. During the time when these are rotated from the position shown in FIGS. 6 and 8 through the angle B, the inner clutch member 26 is accelerated to a speed of rotation substantially equal to that of the outer clutch member 32 by virtue of the provision of the acceleration section 48f. Upon angular movement through the angle B, the roller 86 is brought out of engagement with the cam surface 76b of the cam 76, so that the compression spring 80 urges the cam 76 to angularly move counterclockwise. As a result, the bushing 30 is caused to angularly move by the angle C relative to the inner clutch member 26, so that the rollers 34 are formed in between the inner and outer clutch members 26 and 32 and held in locking engagement therewith, as shown in FIG. 9, thereby engaging the clutch 10. As described, since the speed of rotation of the inner clutch member 26 is substantially equal to that of the outer clutch member 32, there is produced no substantial impact when the rollers 34 are brought into locking engagement with the inner and outer clutch members 26 and 32.

Thus, the rotation of the outer clutch member 32 is transmitted to the shaft 22. Then, the end 76d of the cam 76 is brought into engagement with the roller 86, so that the cam 76 is angularly moved about the pin 78 clockwise against the bias of the compression spring 80. As a result, the bushing 30 is angularly moved through the angle C relative to the inner clutch member 26 in the direction opposite to the direction of rotation of the shaft 22, thereby bringing the rollers 34 out of locking engagement with the inner and outer clutch members 26 and 32 to disengage the clutch 10. Then, before the projection 48d of the cam 48 is brought into engagement with the free end 50a of the lever 50, the speed of rotation of the cam 48 is decelerated to substantially zero by virtue of the provision of the deceleration section 48g, and the actuating section 48e is again brought into engagement with the cam follower 60c to contract the compression spring 60b axially. Thus, the compression spring 60b is again axially compressed to store therein the energy or force for actuating the cam 48 subsequently. Thus, during one revolution of the shaft 22, the clutch 10 is engaged and disengaged.

What is claimed is:
1. A clutch comprising:
(a) an inner clutch member of a cylindrical shape for being fixedly mounted on a shaft having an axis of rotation;
(b) a bushing mounted on said inner clutch member for angular movement about the axis of the shaft;
(c) an outer clutch member mounted on said bushing and being connectable to drive means for being driven for rotation at a predetermined speed;
(d) coupling means carried by said bushing and interposed between said inner and outer clutch members for locking engagement with said inner and outer clutch members;
(e) a first cam of a generally circular shape fixedly mounted on the shaft for rotation therewith, said cam having around its periphery a cam surface having an actuating section and a pair of acceleration and deceleration sections on opposite sides of said actuating section, said cam having a projection;
(f) a second cam mounted on said first cam for angular movement relative thereto and coupled to said bushing, said second cam having a cam surface;
(g) keeper means engageable with said projection for holding said first cam against rotation, said keeper means being operable to become disengaged from said projection;

(h) actuator means movable into and out of an operative position in which said actuator means is engageable with said actuating section of said first cam for initiating the rotation of said first cam when said keeper means becomes disengaged from said projection, said actuator means being engageable with said acceleration section at an initial portion of one revolution of said first cam to rotate said first cam at a speed generally corresponding to said predetermined speed of rotation of said outer clutch member, said actuator means being engageable with said deceleration section at a final portion of the revolution of said first cam to decelerate the speed of rotation of said first cam, and at the final portion of the revolution of said first cam, said actuating section being engageable with said actuator means for setting it in its operative position;

(i) engaging means engageable with said cam surface of said second cam during the initial and final portions of the revolution of said first cam; and (j) urging means for urging said second cam to angularly move in one direction when said engaging means becomes disengaged from said cam surface of said second cam immediately after the initial portion of the revolution of said first cam, thereby angularly moving said bushing relative to said inner clutch member to bring said coupling means into locking engagement with said inner and outer clutch members to connect them together;

(k) said engaging means being engageable with said second cam immediately before the final portion of the revolution of said first cam, thereby angularly moving said second cam in the other direction to angularly move said bushing relative to said inner clutch member to bring said coupling means out of locking engagement with said inner and outer clutch members to disconnect them.

2. A clutch according to claim 1, in which said actuator means comprises a compression spring, and a roller mounted on one end of said spring and urged into rolling engagement with said cam surface of said first cam, said compression spring being compressed when said actuator means in its operative position for initiating the revolution of said first cam when said keeper means becomes disengaged from said projection.

3. A clutch according to claim 1, in which said inner clutch member has a plurality of flat portions formed on an outer circumferential surface thereof, said bushing having a plurality of circumferentially-spaced slots formed therethrough and disposed between said inner and outer clutch members, said slots being disposed in registry with said flat portions, respectively, said coupling means comprising a plurality of rollers received in said slots, respectively, and disposed along the axis of said inner clutch member, and said rollers being brought into locking engagement with said inner and outer clutch members when said bushing is angularly moved relative to said inner clutch member.

4. A clutch according to claim 1, in which said urging means comprises a compression spring acting between said first cam and said second cam for angularly moving said second cam, said engaging means comprising a roller disposed in rolling engagement with said cam surface of said second cam.

5. A clutch according to claim 1, in which said keeper means comprises a lever pivotally mounted on a body intermediate opposite ends thereof for angular movement between an operative position where one end of said lever engages said projection of said first cam and an inoperative position where said one end is disengaged from said projection, a solenoid operatively connected to the other end of said lever for angularly moving said lever between its operative and inoperative positions, and a tension spring mounted on said body for returning said lever from its inoperative to operative position.

* * * * *